# United States Patent Office 3,419,808
Patented Dec. 31, 1968

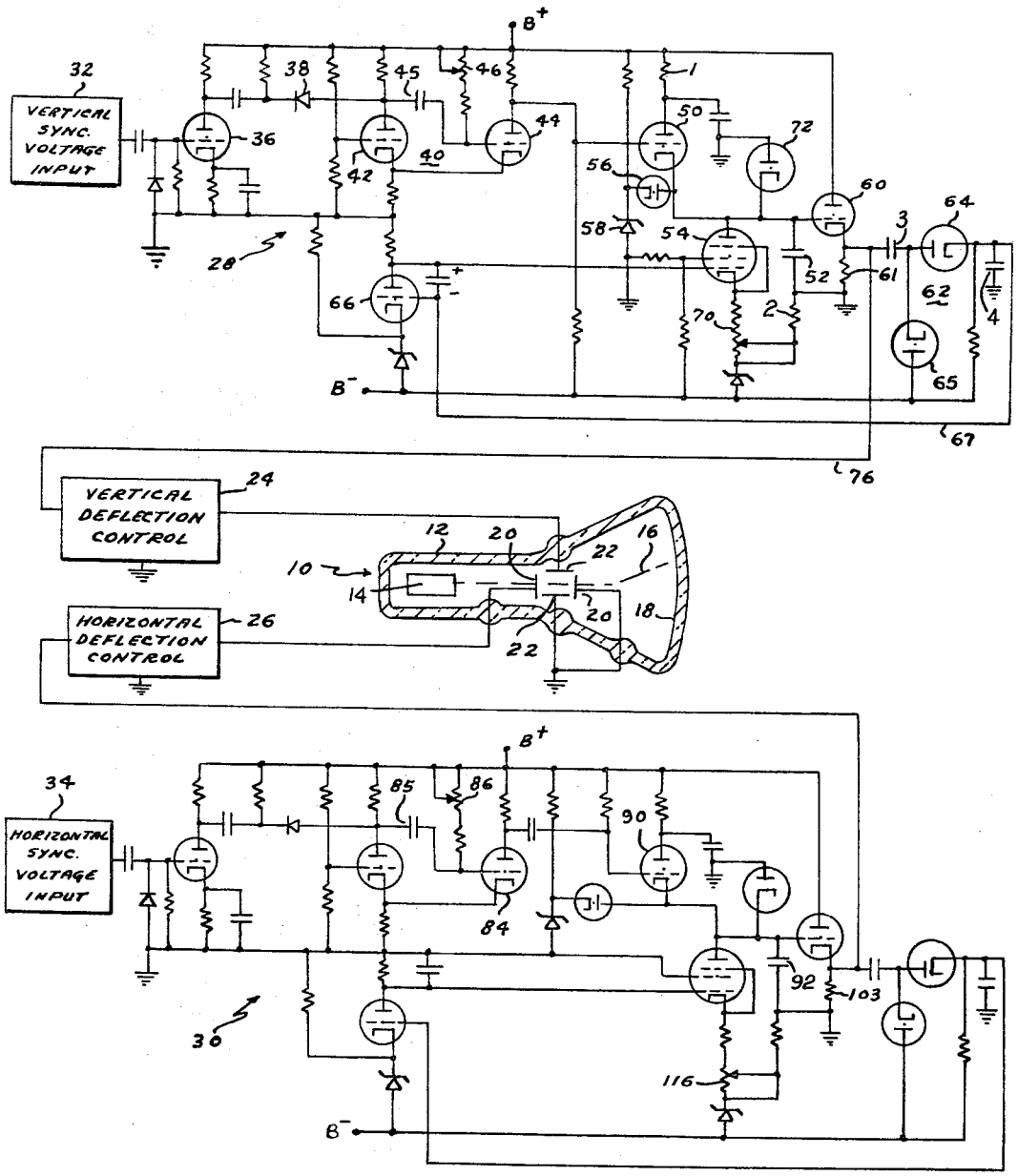

3,419,808
CONTINUOUSLY VARIABLE CIRCUIT FOR CONTROLLING THE SWEEP OF AN OSCILLOSCOPE
John G. Lenhoff, Jr., Linthicum Heights, Md., assignor, by mesne assignments, to the United States of America as represented by the Secretary of the Air Force
Filed June 28, 1966, Ser. No. 562,441
1 Claim. (Cl. 328—183)

ABSTRACT OF THE DISCLOSURE

A linear sweep voltage generator for a cathode ray tube in which the sweep voltage is generated by the alternate charging and discharging of a capacitor. The same starting point for each sweep is insured by limiting the maximum capacitor voltage during charging to a fixed reference value established by a Zener diode regulator. A high degree of sweep linearity is achieved by discharging the capacitor through a pentode having negative current feedback to hold the discharge current constant. The amplitude of the sweep is held constant over a wide range of sweep frequencies by making the capacitor discharge rate an inverse function of the sweep voltage amplitude through varying the pentode control grid potential as an inverse function of the sweep voltage amplitude.

---

This invention relates to cathode-ray oscilloscopes in which variable vertical and horizontal sweep voltages are of paramount importance.

The amplitude of sweep waveforms generated for use in cathode-ray oscilloscopes is generally dependent on the frequency of the input signal which is applied in the form of synchronizing pulses. This is generally true for such sweep voltage generators as charging capacitors, Miller sweeps, bootstrap circuits etc. With sweep-voltage generating circuits hitherto used, the slope of the sweep voltage waveform is a constant and the amplitude is inversely proportional to frequency. With such fixed conditions in the parameters which control the sweep characteristics, some difficulty is encountered in adjusting the values of the time constants involved when it is desired to change the scan rate, whether it be for horizontal or vertical deflection. Should it become necessary to change the scan rate often, then a complex switching network must be provided for attaining the time constant for each rate selected. Multiple lumped time constant elements have the disadvantage moreover of offering discrete increments in the scan rate instead of a continuous change in the vertical and horizontal sync pulse frequencies.

Accordingly, an object of the invention is to provide sweep circuits for cathode-ray oscilloscopes.

Another object of the invention is the provision of improved sweep-voltage generators in both the horizontal and vertical beam deflection circuits.

Yet another object of the invention is to provide sweep-voltage generating circuits which are self adjusting in amplitude, and which require no amplitude control with different selections of the horizontal and vertical synchronizing pulse frequencies.

Still a further object of the invention is the provision of a cathode-ray oscilloscope circuit having a linear sweep voltage which is constant in amplitude for any selected frequency or scan rate.

Other features, objects and advantages of the invention will become more apparent from the following detailed description of one embodiment of the invention when read in connection with the accompanying single figure which is a schematic diagram of the invention.

Referring now to the drawing, a cathode-ray tube 10 with which the invention to be described is utilized has an envelope 12 inclosing an electron gun 14. The gun 14 is supplied with the necessary power and beam forming means, not shown, to provide an electron beam 16 which is directed onto the face 18 of the tube 10. Electrostatic beam deflecting means comprising horizontal and vertical deflection plates 20 and 22, respectively, are provided for controlling the beam. A vertical deflection control unit 24 representing the usual vertical sweep output producing means is connected to the vertical deflection plates 22. A horizontal deflection control unit 26 which may be taken, for example, to represent the stages including the horizontal output amplifier and flyback transformer is connected to the horizontal deflection plates 20.

The invention embodiment illustrated in the figure essentially comprises two circuit diagrams consolidated into a single schematic diagram in order to best illustrate the use of the invention where vertical and horizontal sweep generation is of cardinal importance. That portion of the illustrated embodiment in the figure which appears above CRT 10 is the vertical waveform generator and has been given the general reference character 28. The other portion of the illustrated embodiment which lies below the CRT 10 is the horizontal waveform generator which herein has been generally designated 30. For supplying sync pulses to the waveform generators 28 and 30, there has been shown sources 32 and 34 of vertical and horizontal sync voltages. For example, it is known in television that to keep the picture elements in their proper order for piecing together at the receiver screen, synchronizing pulses are introduced into the video signal. In the receiver, these pulses are applied to the deflection circuits and control the timing of the receiver generated signals which deflect the beam in the CRT. As an illustration, in the United States the vertical and horizontal sync pulses currently in commercial use are 60 and 15,750 c.p.s., respectively, and they function to maintain vertical and horizontal synchronization between the transmitter and receiver. Other values for the vertical and horizontal sync rates are prevalent in other countries of the world so that, under foreign standards, a receiver made for operation in the United States would be of small use abroad without corresponding and extensive circuit changes to cope with the unfamiliar scan rates. Receivers of foreign manufacture likewise would require internal modification when used where other standards apply. Accordingly, for purposes of the present invention, it may be assumed that, in one arrangement, the respective outputs of sources 32 and 34 will function to produce vertical deflection with the m-c.p.s. vertical sync pulses of the composite video signal, and the other input signals will function to produce horizontal deflection with the m+n-c.p.s. horizontal sync pulses of the composite video signal.

As an alternate arrangement for producing sync pulses at the desired rates, it will be appreciated by those skilled in the art that, for closed-circuit television, vertical and horizontal sync pulses may be synchronized to a single oscillator of variable output frequency. The desired vertical and horizontal sweep rates are then produced through the use of appropriate frequency multiplying or dividing circuits. Such a unified system allows both the vertical and horizontal sweep frequencies to be obtained from a single control.

OPERATION

Considering first the vertical sweep voltage generator 28, positive-going vertical synchronizing pulses, occurring at a repetition rate subject to variation, are supplied by source 32 to the control grid of pulse amplifier and inverter tube 36. The resulting negative-going synchronizing pulses at the anode of this tube are applied through diode 38 to the anode of tube 42 and further through capacitor 45 to the control grid of tube 44. Tubes 42 and 44 are elements of a monostable multivibrator circuit 40, in the normal or stable state of which tube 44 is fully conductive and tube 42 is cut off. Since tube 42 is already nonconductive, the negative pulse on its anode has no effect on the circuit. However, on the grid of tube 44, the negative pulse has the effect of reducing the conduction in this tube and, as a result of the regenerative nature of the circuit, instituting an instantaneous switching of the circuit to its unstable state in which tube 42 is conductive and tube 44 cut off. The circuit remains in its unstable state for a predetermined interval of time depending upon its time constant, which in turn depends principally upon the values of capacitor 45 and variable resistor 46. At the end of this interval the circuit instantly reverts to its stable state with tube 42 cut off and tube 44 conducting. In going through this cycle of operation a positive-going rectangular pulse, of a duration equal to the interval during which the circuit 40 remains in its unstable state, is produced at the anode of tube 44. Each synchronizing pulse from source 32 therefore triggers a cycle of operation of the monostable multivibrator and the production of a pulse at the anode of tube 44.

The desired sweep voltage is generated across capacitor 52 by first rapidly charging this capacitor to a predetermined fixed voltage and then allowing it to discharge at a constant rate to produce a sweep voltage that varies linearly with time. The rapid charging of capacitor 52, which in its effect on cathode ray tube 12 produces the rapid return of beam 16 to the starting point of the vertical sweep, is accomplished through tube 50 during the interval defined by the positive pulse on the anode of tube 44. For this purpose, the control grid of tube 50 is directly coupled to the anode of tube 44 and is so biased that the tube is normally nonconductive. The positive pulse renders tube 50 conductive and permits capacitor 52 to rapidly charge from the B+ source through resistor 1 and this tube. Capacitor 52 charges until it reaches a potential equal to the fixed voltage across Zener diode 58. Any increase in capacitor potential above this value is prevented by conduction in switching diode 56. At the end of the positive pulse on the control grid of tube 50 this tube again becomes nonconductive disrupting the charging circuit of capacitor 52.

As soon as tube 50 has returned to its nonconductive state capacitor 52 starts to discharge through pentode 54, resistor 70, and resistor 2. As will be seen later, the circuit is designed to cause this discharge to take place at a contant rate so that the fall in capacitor 52 voltage is linear with respect to time. The discharge continues until the next synchronizing pulse occurs and initiates a new cycle of operation at the start of which capacitor 52 recharges to the potential of Zener diode 58 as described above. The capacitor potential is prevented from ever changing sign by diode 72 which will not permit the upper terminal of the capacitor to fall below ground potential.

The waveform produced across capacitor 52 in the manner described above constitutes the vertical sweep waveform for cathode ray tube 12. The portion of the waveform produced by the rapid charging of capacitor 52 to a fixed constant voltage is responsible for rapidly returning the beam 16 to exactly the same starting point for each vertical sweep, and the portion produced by discharging capacitor 52 at a constant rate is responsible for vertically deflecting beam 16 across the face of the screen at a constant rate. This waveform is reproduced across load resistor 61 of cathode follower 60 from which it is applied by way of conductor 76 and vertical deflection circuit 24 to the vertical deflection plates 22 of the cathode ray tube.

The discharge of capacitor 52 is made to occur at a constant rate by holding the discharge current constant. Since the current flow in a pentode is to a considerable degree independent of the anode voltage it approaches a constant current device in performance. This effect is greatly increased in the described circuit by the use of negative current feedback to the control grid. The feedback is accomplished by resistor 70 which also serves to adjust the operating range of the pentode to suit the sweep frequency range over which the sweep amplitude is to be held constant, as will be seen later. Since resistor 70 is included in the control grid-cathode circuit of the pentode, the voltage produced across this resistor by the capacitor 52 dicharge current influences the grid-cathode voltage in such a way as to oppose any change in this current. Since the amplification of a pentode is very high, this technique is very effective in holding the discharge current constant and producing a sweep voltage that varies linearly with time.

Since the extent to which capacitor 52 discharges depends upon the interval between synchronizing pulses, it is apparent that the amplitude of the sweep waveform across capacitor 52 is directly related to this interval or inversely related to the sweep frequency. In order to hold the sweep amplitude constant and independent of the sweep frequency provision is made for controlling the rate of discharge of capacitor 52, through controlling the grid bias of tube 54, as an inverse function of the peak-to-peak amplitude of the sweep waveform. To this end, the sweep waveform across resistor 61 is separated from its direct current component by blocking capacitor 3 and applied to peak detector 62 comprising diodes 64 and 65. As a result, a direct voltage equal to the peak amplitude of the positive half cycle of the resulting alternating waveform is developed across capacitor 4 by diode 64. Since the peak amplitude of the positive half cycle of the alternating waveform equals the peak amplitude of the negative half cycle, the voltage across capacitor 4 equals one-half of, and is therefore proportional to, the peak-to-peak amplitude of the sweep waveform.

The voltage across capacitor 4 is applied over conductor 67 to the control grid of amplifier-inverter 66 and thence to the control grid of tube 54. Any tendency for the amplitude of the sweep waveform to increase, such as would occur were the synchronizing frequency decreased, causes the voltage across capacitor 4 to tend to increase and the grid voltage of tube 54 to decrease due to the inversion of tube 66. The result is a decrease in the discharge rate of capacitor 52 which counteracts the tendency of the sweep amplitude to increase due to the longer discharge interval. Similarly, a tendency for the sweep amplitude to decrease, as would result from an increase in sweep frequency, results in an increase in tube 54 grid potential and an increase in the capacitor 52 discharge rate to counteract the tendency of the sweep amplitude to decrease due to the shorter discharge interval. In this manner the amplitude of the sweep voltage is held constant over a range of sweep frequency variation determined by the setting of variable resistor 70.

Vertical waveform generator 28 will provide a linear sweep voltage over the range extending below 2 c.p.s. to above 60 c.p.s. through use of typical circuit components having approximate values listed as follows as an illustrative case:

| | | |
|---|---|---|
| Variable resistor 46 | ohms | 500,000 |
| Capacitor 45 | µfd | .022 |
| Capacitor 52 | µfd | .33 |
| Variable resistor 70 | ohms | 25,000 |
| Resistor 61 | do | 2,000 |

The horizontal sweep waveform generator 30 is the same as the vertical circuit described above except that certain time constants are shorter in keeping with the higher horizontal sweep frequencies and it is not necessary to use direct coupling between tubes 84 and 90, which correspond to tubes 44 and 50 of the vertical circuit. Typical element values for a horizontal circuit designed to operate over a frequency range of 1500 to over 15,000 cycles per second are:

| | |
|---|---:|
| Variable resistor 86 _____ohms__ | 500,000 |
| Capacitor 85 _____pfd__ | 150 |
| Capacitor 92 _____pfd__ | 2200 |
| Variable resistor 116 _____ohms__ | 25,000 |
| Resistor 103 _____do____ | 2,000 |

The foregoing description has illustrated the use of the invention in those systems where non-standard vertical and horizontal rates are of grave concern. The invention is particularly applicable to the field of television; it requires no complex network, its operation causes no inconvenience, and the method of amplitude control is adapted to respond smoothly in response to continuous frequency changes at the input. The vertical and horizontal waveform generators 28 and 30 also readily lend themselves to adjustment independently of each other as this will permit the sync rate applied to one of the waveform generators to undergo change while the sync rate at the other waveform generator is held constant. It therefore will be appreciated that a television receiver using the invention as described could be made to operate with the different television scanning standards found throughout the world. The invention therefore offers the outstanding advantage over the prior art in that with the coming of intercontinental television transmission through the use of satellite repeaters it will be possible for one receiver arranged according to the present invention to accommodate all foreign transmissions automatically.

The invention has further applications in the general area of the use of image storage tubes in satellites of the type mentioned. As the distance of the satellite from the earth increases, the bandwidth of the transmitter spectrum generally is reduced due to the power capability of the repeater in the satellite. The reduction of bandwidth produces a corresponding reduction in the data rate and the scanning rate. As the satellite recedes further from the earth, the scanning rates could be reduced and the invention herein described would accomplish constant-amplitude sweep deflection voltages in order to leave the television image on the screen unaffected in size.

While vacuum tubes are shown throughout the invention embodiment, it will be obvious that transistorized counterparts for each of the vacuum tubes shown could be used in place thereof, depending on the design requirements in particular cases.

The invention described hereinabove has the special advantage as a performance-monitoring apparatus for applications related to checking the efficiency of special-duty television systems, where scanning rates can be expected to be changed frequently and rapidly. Also, amplitude adjustment is accomplished internally by the use of virtually identical horizontal and vertical waveform generators arranged to respond in uniform fashion even when different frequency ranges are involved.

Although only one embodiment of the invention has been illustrated and described, it will be apparent to those skilled in the art that various changes and modifications may be made therein without departing from the spirit of the invention or the scope of the appended claim.

I claim:

1. A sweep waveform generator comprising: a capacitor across which said waveform is generated, said capacitor having one terminal connected to a point of reference potential; means providing a point of fixed positive potential relative said reference potential; a triode having its anode connected through a resistor to said point of positive potential and its cathode connected to the other terminal of said capacitor; means normally biasing the control grid of said triode beyond anode current cut off; a monostable multivibrator for generating in each cycle of operation a positive-going pulse of relatively short duration; means for applying synchronizing pulses to said multivibrator for triggering a cycle of operation and the production of a positive-going pulse for each synchronizing pulse; means for applying said positive-going pulses to the control grid of said triode for rendering the triode fully conductive for the duration of each pulse and permitting said capacitor to charge through said triode during the presence of each pulse; a Zener diode voltage regulator having its anode connected to said point of reference potential and its cathode connected through a resistor to said point of positive potential; a switching diode having its anode connected to said other terminal of said capacitor and its cathode connected to the cathode of said Zener diode for limiting the capacitor voltage to a value equal to the voltage drop across said Zener diode; a discharge path for said capacitor comprising a pentode having its anode connected to the said other terminal of said capacitor and a variable resistor connected between the cathode of said pentode and said point of reference potential; a circuit connected between the control grid and cathode of said pentode that includes said variable resistor whereby a negative feedback voltage proportional to the capacitor discharge current in said variable resistor is provided to said control grid for holding said discharge current at a constant value; means for producing a control voltage proportional to the peak-to-peak amplitude of the sweep waveform across said capacitor; means for amplifying and inverting said control voltage to produce a voltage inversely proportional to said peak-to-peak amplitude; and means for introducing said inverse voltage into the control grid-cathode circuit of said pentode for controlling the control grid potential of said pentode and thereby the rate of discharge of said capacitor as an inverse function of said peak-to-peak amplitude for counteracting the change in said sweep waveform amplitude that would otherwise occur with a change in synchronizing pulse frequency.

References Cited

UNITED STATES PATENTS 2,448,069   8/1948   Ames et al. _____ 315—19 X
2,753,451   7/1956   Cetrone _____ 315—19 X RODNEY D. BENNETT, *Primary Examiner.*

T. H. TUBBESING, *Assistant Examiner.*

U.S. Cl. X.R.

328—184, 185, 168; 315—24